(12) United States Patent
Hasegawa et al.

(10) Patent No.: US 7,650,955 B2
(45) Date of Patent: Jan. 26, 2010

(54) SWING ARM SUPPORT STRUCTURE OF VEHICLE

(75) Inventors: Yosuke Hasegawa, Saitama (JP); Kazuro Furukawa, Saitama (JP); Katsumasa Mukai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 251 days.

(21) Appl. No.: 11/808,741

(22) Filed: Jun. 12, 2007

(65) Prior Publication Data

US 2007/0284847 A1    Dec. 13, 2007

(30) Foreign Application Priority Data

Jun. 13, 2006  (JP) ............................. 2006-163963

(51) Int. Cl.
*B62K 11/04* (2006.01)
(52) U.S. Cl. ...................................... 180/227
(58) Field of Classification Search .................. 180/227
See application file for complete search history.

(56) References Cited

U.S. PATENT DOCUMENTS

| | | | | |
|---|---|---|---|---|
| 4,621,706 A | * | 11/1986 | Boyesen | 180/227 |
| 4,706,774 A | * | 11/1987 | Tsuboi | 180/227 |
| 4,809,802 A | * | 3/1989 | Seino et al. | 180/231 |
| 5,069,303 A | * | 12/1991 | Fuller | 180/219 |
| 5,480,001 A | * | 1/1996 | Hara | 180/227 |
| 6,527,289 B2 | * | 3/2003 | Parigian | 280/284 |
| 7,137,468 B2 | * | 11/2006 | Siddle | 180/227 |
| 7,159,885 B2 | * | 1/2007 | Toyoda et al. | 280/284 |
| 7,267,193 B2 | * | 9/2007 | Nagashii et al. | 180/219 |
| 2002/0089145 A1 | * | 7/2002 | Toyoda et al. | 280/281.1 |
| 2006/0151226 A1 | * | 7/2006 | Misaki et al. | 180/227 |

FOREIGN PATENT DOCUMENTS

| CN | 1364717 A | 8/2002 |
|---|---|---|
| JP | 61-17715 B2 | 5/1986 |

* cited by examiner

*Primary Examiner*—Lesley Morris
*Assistant Examiner*—Michael R Stabley
(74) *Attorney, Agent, or Firm*—Birch, Stewart, Kolasch & Birch, LLP

(57) ABSTRACT

To improve a swing arm support structure of a vehicle, thus making it possible to adjust a magnitude, timing, and the like of external force transmitted to a vehicle body frame. In a vehicle, in which a rear wheel is attached to a rear end of a swing arm made freely swingable with respect to a vehicle body frame, dogleg brackets are provided. The dogleg brackets include vehicle body frame coupling portions coupled to the vehicle body frame, and include engine support portions for supporting an engine. Further, the dogleg brackets are provided with swing arm support portions for supporting the swing arm which are provided apart and separately from the vehicle body frame coupling portions.

20 Claims, 5 Drawing Sheets

SWING ARM SUPPORT STRUCTURE OF VEHICLE

CROSS-REFERENCE TO RELATED APPLICATIONS

The present application claims priority under 35 USC 119 to Japanese Patent Application No. 2006-163963 filed on Jun. 13, 2006 the entire contents of which are hereby incorporated by reference.

BACKGROUND OF THE INVENTION

1. Field of the Invention

The present invention relates to an improvement of a swing arm support structure for a vehicle.

2. Description of Background Art

A conventional swing arm support structure for a vehicle is known wherein a bracket member that supports an engine is coupled to a vehicle body frame with a rear fork supported by the vehicle body frame. See, for example, Japanese Examined Patent Publication No. S61-17715.

As shown in FIG. 1 and FIG. 3 of Japanese Examined Patent Publication No. S61-17715, a bracket member 5 includes a left and right pair of side plates 5a and 5b, and a cylindrical portion 5c bridged between the center portions of the side plates 5a and 5b. Both ends of each of the side plates 5a and 5b are attached to a rear portion of an engine 1, and the cylindrical portion 5c is coupled to a vehicle body frame 2 by a pivot shaft 13. Moreover, the pivot shaft 13 is fitted into holes 12 and 12 provided on a front end of a rear fork 10 with the rear fork 10 supported on the vehicle body frame 2 being allowed to swing freely.

When the rear fork 10 is directly attached to the vehicle body frame 2 like in the above-described patent document, for example, an external force is transmitted from a road surface to the vehicle body frame 2 through a rear wheel and the rear fork 10. Consequently, it has been difficult to adjust a magnitude and timing of the external force transmitted to the vehicle body frame.

SUMMARY AND OBJECTS OF THE INVENTION

It is an object of the present invention to improve the swing arm support structure of the vehicle, thus making it possible to adjust the magnitude, timing, and the like of the external force transmitted to the vehicle body frame.

According to an embodiment of the present invention, a swing arm support structure for a vehicle is provided in which a rear wheel is attached to a rear end of a swing arm that is freely swingable with respect to a vehicle body frame. A bracket includes a vehicle body frame coupling portion coupled to the vehicle body frame with an engine support portion that supports an engine. The first aspect of the present invention is characterized in that a swing arm support portion that supports the swing arm is provided in the bracket with the swing arm support portion being provided apart and separately from the vehicle body frame coupling portion.

As an advantageous effect of the above-described aspect, the swing arm support portion is provided apart and separately from the vehicle body frame coupling portion, thus making it possible to generate torsion between the swing arm support portion and the vehicle body frame coupling portion. Moreover, for example, when a distance between the vehicle body frame coupling portion and the swing arm support portion in the bracket is changed, it is made possible to change the transmission of the external force (magnitude, timing, and the like of external force) transmitted from the swing arm through the bracket to the vehicle body frame.

According to an embodiment of the present invention, a recessed portion recessed in a vehicle width direction is formed in the bracket. A power transmission shaft extends from the engine side in order to drive the rear wheel with the power transmission extending through the recessed portion.

As an advantageous effect of an embodiment of the present invention, the recessed portion of the bracket, which is recessed in the vehicle width direction, becomes a space where the power transmission shaft is disposed.

According to an embodiment of the present invention, a left and right pair of the brackets are provided with the recessed portions being formed in the left and right brackets to be recessed in a same direction along the vehicle width direction, and the swing arm support portions are formed in bottom portions of the recessed portions.

As an advantageous effect of the above-described aspect, it is made possible by the recessed portions to ensure the space where the drive shaft is disposed. In addition, since the recessed portions are recessed in the same direction, a distance between the bottom portions of the left and right recessed portions is ensured. More specifically, a distance between the left and right swing arm support portions is ensured.

According to an embodiment of the present invention, the vehicle body frame is disposed so as to cover outer sides of the swing arm support portions.

As an advantageous effect of the above-described aspect, since the swing arm support portions are covered with the vehicle body frame and do not protrude sideward of a vehicle body, it is made possible for an operator to lower the legs straight down. Thus it is easier for the operator to land his/her feet on the ground.

According to an embodiment of the present invention, each of the brackets is coupled to the vehicle body frame side by two points, in upper and lower regions.

As an advantageous effect of the above-described aspect, each of the brackets is coupled to the vehicle body frame side by the two points in upper and lower regions, whereby the brackets are tightly supported.

According to an embodiment of the present invention, the swing arm support portion is provided apart and separately from the vehicle body frame coupling portion. Accordingly, torsion can be generated in the bracket between the swing arm support portion and the vehicle body frame coupling portion. Moreover, the distance between the swing arm support portion and the vehicle body frame coupling portion is changed, thus making it possible to easily adjust the transmission of the external force transmitted from the rear wheel through the swing arm to the vehicle body frame. Consequently, designing can be performed more freely.

According to an embodiment of the present invention, the recessed portion recessed in the vehicle width direction is formed in the bracket. The power transmission shaft extending from the engine side in order to drive the rear wheel is made to go through the recessed portion. Accordingly, the space through which the power transmission shaft is made to go through can be easily ensured.

According to an embodiment of the present invention, the left and right pair of brackets are provided with the recessed portions being formed in the left and right brackets to be recessed in the same direction along the vehicle width direction. The swing arm support portions are formed in the bottom portions of the recessed portions. Accordingly, an interval between which the swing arm is supported can be ensured easily, thus making it possible to enhance torsion rigidity of the swing arm.

According to an embodiment of the present invention, the vehicle body frame is disposed so as to cover the outer sides of the swing arm support portions. Accordingly, both end portions of a pivot shaft that supports the swing arm do not protrude crosswise, thus making it easier for the operator to land the feet.

According to an embodiment of the present invention, each of the brackets is coupled to the vehicle body frame side by the two points in upper and lower regions. Accordingly, the brackets can be supported tightly, and the engine and the swing arm can be supported securely by the brackets as described above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
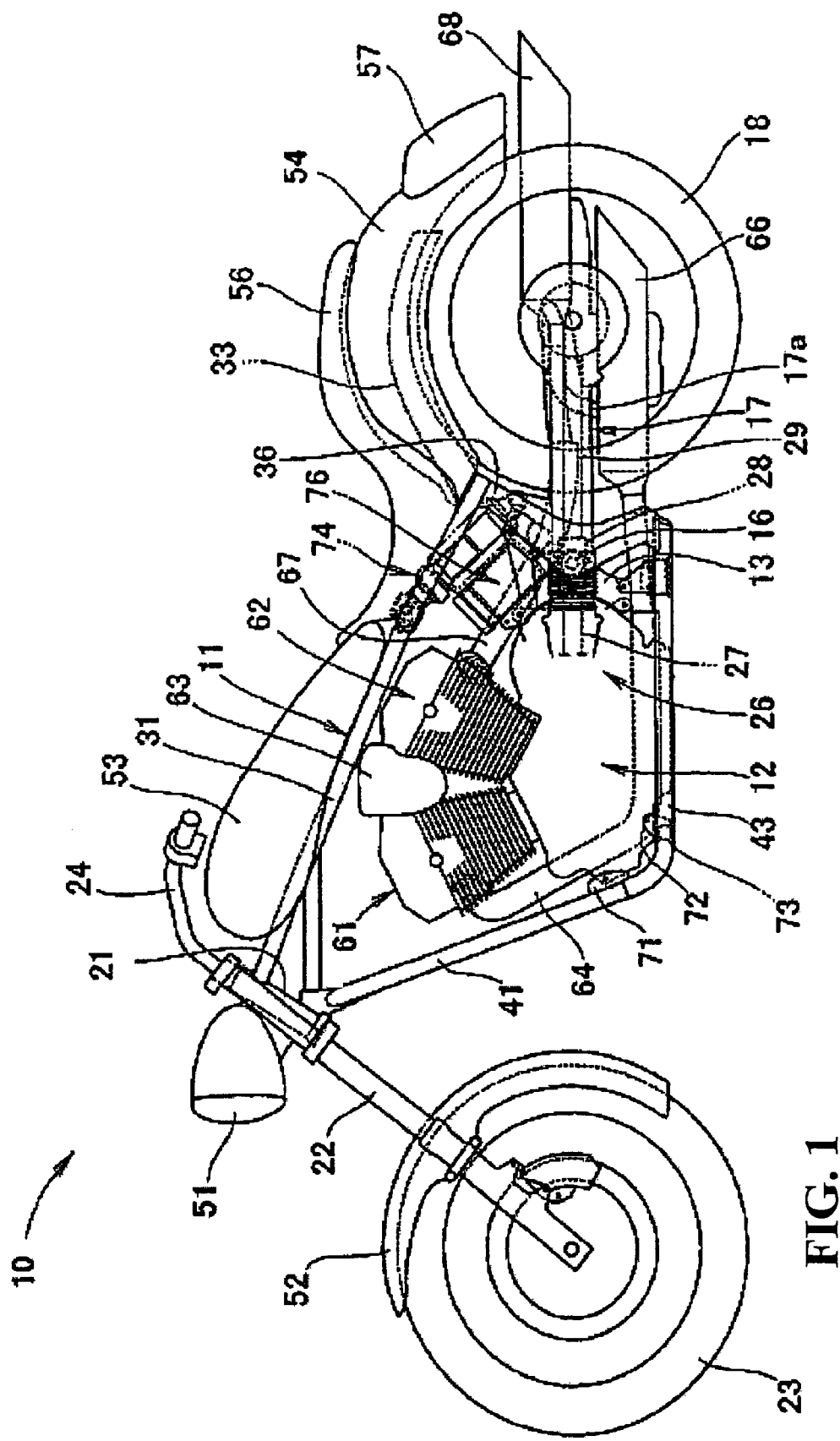
FIG. 1 is a side view of a vehicle that adopts a swing arm support structure according to the present invention.

A description will be made below of a best mode for carrying out the present invention based on the accompanying drawings. Note that the drawings are defined to be viewed in the orientation of the reference numerals.

FIG. 1 is a side view of a vehicle that adopts a swing arm support structure according to the present invention. A vehicle 10 is an American-type motorcycle including a vehicle body frame 11 with a V-engine 12 disposed inside the vehicle body frame 11. A left and right pair of dogleg brackets 13 and 14 (only the front-side reference numeral 13 is shown) are disposed rearward of the engine 12 and are attached to a rear portion of the engine 12 and the vehicle body frame 11 side. A swing arm 17 is attached so as to swing freely in the vertical direction to the dogleg brackets 13 and 14 through a pivot shaft 16. A rear wheel 18 is attached to a rear end of this swing arm 17. A front fork 22 is allowed to be steered freely and is attached to a head pipe 21 that is disposed in a front end of the vehicle body frame 11. A front wheel 23 is attached to a lower end portion of the front fork 22 with a bar handle 24 attached to an upper end portion of the front fork 22.

The vehicle body frame 11 includes the above-described head pipe 21 with a left and right pair of main frames 31 and 32 (only the front-side reference numeral 31 is shown) extending rearwardly from the head pipe 21. A left and right pair of rear upper frames 33 and 34 (only the front-side reference numeral 33 is shown) and a left and right pair of center frames 36 and 37 (only the front-side reference numeral 36 is shown) are both attached to rear portions of the main frames 31 and 32. A left and right pair of down frames 41 and 42 (only the front-side reference numeral 41 is shown) extend substantially downwardly from the head pipe 21. A left and right pair of lower frames 43 and 44 are coupled to lower ends of the down frames 41 and 42 and are attached to lower ends of the center frames 36 and 37. Cross members (not shown) couple the above-described left frame members and the right frame members to each other.

The engine 12 integrally includes a transmission 26 in a rear portion thereof. This transmission 26 is one in which an output shaft 27 is coupled to a drive shaft 29 through a universal joint 28. Power is transmitted from the transmission 26 through the drive shaft 29 to the rear wheel 18. A shaft housing portion 17a is formed on a left side portion of the swing arm 17 in order to house the drive shaft 29 therein.

A headlamp 51 is attached to the head pipe 21 with a front fender 52 for covering an upper portion of the front wheel 23. A fuel tank 53 is attached to the main frames 31 and 32. A rear fender 54 is attached to the rear upper frames 33 and 34 in order to cover an upper portion of the rear wheel 18. A seat 56 is attached to the main frames 31 and 32 and the rear fender 54. A tail lamp 57 is attached to a rear portion of the rear fender 54. A front cylinder portion 61 and a rear cylinder portion 62 are provided in the engine 12. A carburetor 63 is connected to the front cylinder portion 61 and the rear cylinder portion 62. A first exhaust pipe 64 extends obliquely downwardly toward a rear from the front cylinder portion 61 and then extends rearwardly. A first muffler 66 is connected to a rear end of the first exhaust pipe 64. A second exhaust pipe 67 extends substantially rearwardly from the rear cylinder portion 62. A second muffler 68 is connected to a rear end of the second exhaust pipe 67. Engine support brackets 71 and 72 are provided on the down frames 41 and 42 and the lower frames 43 and 44. More specifically, a cross pipe 73 is bridged between the left and right lower frames 43 and 44, respectively, in order to support a front portion and a lower portion of the engine 12. A rear shock absorber 74 is attached to be bridged between the swing arm 17 and the vehicle body frame 11. A battery 76 is provided.

Figure 2:
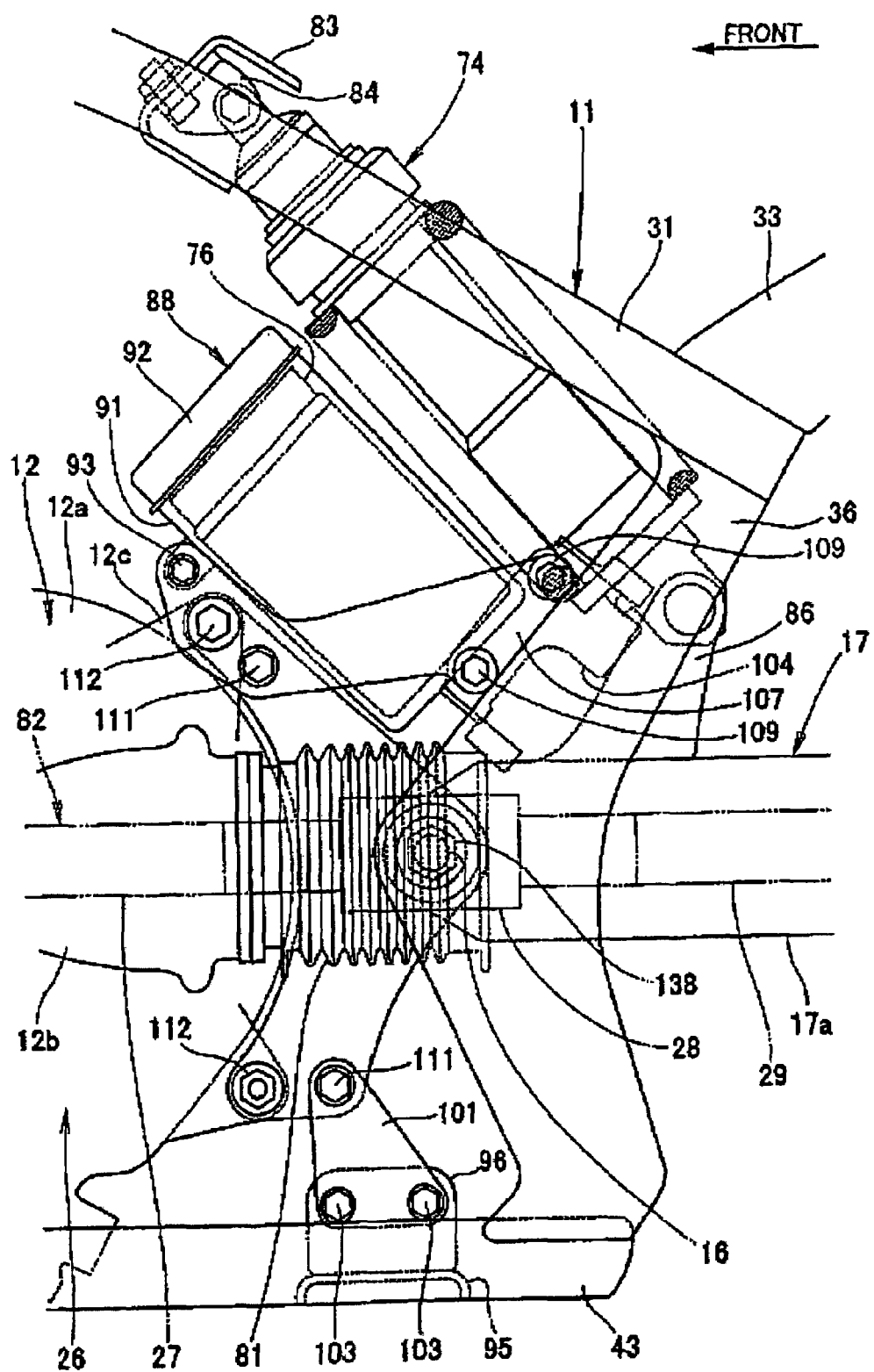
FIG. 2 is a main portion side view showing a pivot shaft and the vicinity thereof of the vehicle according to the present invention.

FIG. 2 is a main portion side view showing the pivot shaft of the vehicle according to the present invention (an arrow (FRONT) in the drawing indicates the front of the vehicle, and the same is applied below). The output shaft 27 of the transmission 26 is housed in an output shaft housing portion 12b provided in a crankcase house 12a of the engine 12. The output shaft housing portion 12b and the shaft housing portion 17a are connected to each other by an accordion rubber boot 81.

The output shaft 27, the universal joint 28, and the drive shaft 29, which are described above, are parts which compose a power transmission shaft 82 transmitting the power from the transmission 26 to the rear wheel 18. See, FIG. 1.

The rubber boot 81 absorbs an angle change between the transmission 26 side and the swing arm 17 side when the swing arm 17 swings to bend the universal joint 28. Moreover, the rubber boot 81 keeps dust from getting in the output shaft housing portion 12b and the shaft housing portion 17a.

A cross member 83 with a U-shape in cross section is provided which is attached to be bridged between the left and right main frames 31 and 32 (only the front-side reference numeral 31 is shown). One end of the rear shock absorber 74 is attached to a support bracket 84 attached to the cross member 83, and the other end of the rear shock absorber 74 is attached to an upper bracket 86 provided on an upper portion of the swing arm 17.

Figure 3:
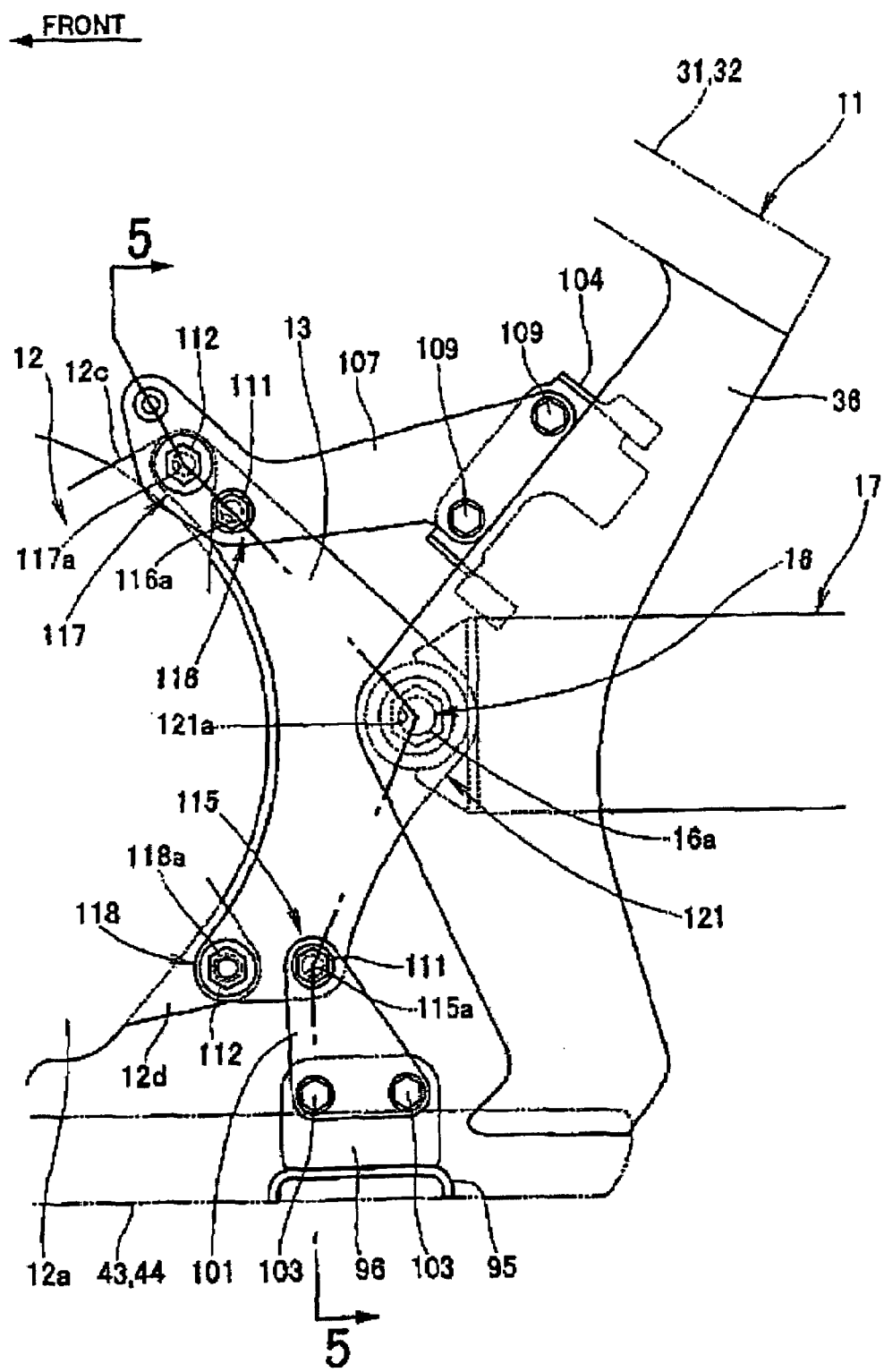
FIG. 3 is a side view showing the swing arm support structure according to the present invention.

The battery 76 is housed in a battery housing case 88 attached to the vehicle body frame 11, as shown in FIG. 3 in more detail. The battery housing case 88 is composed of a case body 91, and a cover member 92 that covers an opening portion of this case body 91.

The battery housing case 88 is attached by bolts 93 to upper brackets 104 and 106 (only one of the reference numerals 104 is shown) and upper plates 107 and 108 (only one of the reference numerals 107 is shown), which will be described later in detail.

FIG. 3 is a side view showing the swing arm support structure according to the present invention. FIG. 3 shows attachment structures to be described below. A cross member 95 is attached to be bridged between the left and right lower frames 43 and 44 of the vehicle body frame 11. A left and right pair of erected plates 96 and 97 (only the front-side reference numeral 96 is shown) are attached to an upper portion of this cross member 95. Triangular plates 101 and 102 (only the front-side reference numeral 101 is shown) are attached by bolts 103 and 103 to these erected plates 96 and 97, respectively. The upper brackets 104 and 106 (only the front-side reference numeral 104 is shown) are attached to the center frames 36 and 37 (only the front-side reference numeral 36 is shown), respectively. The upper plates 107 and 108 (only the front-side reference numeral 107 is shown) are attached by bolts 109 and 109 to the upper brackets 104 and 106, respectively. The dogleg bracket 13 is attached by bolts 111 and 111 to the triangular plate 101 and the upper plate 107. The dogleg bracket 14 is attached by the bolts 111 and 111 to the triangular plate 102 and the upper plate 108. Finally, the engine 12 is attached by bolts 112 and 112 to these dogleg brackets 13 and 14. Portions 12*c* and 12*d* are provided on each of the left and right sides of the crankcase 12*a* of the engine 12 so as to be individually supported by the dogleg brackets 13 and 14.

One end portion 16*a* of the pivot shaft 16 is attached to the dogleg bracket 13. Accordingly, an outer side of the one end portion 16*a* is covered with the center frame 36 and does not protrude sideward of a vehicle body, and is not exposed to the outside.

Each of the dogleg brackets 13 and 14 is a member in which there are drilled a lower coupling hole 115*a*, an upper coupling hole 116*a*, an upper support hole 117*a*, a lower support hole 118*a*, and center support hole 121*a*. Each of the dogleg brackets 13 and 14 includes a vehicle body frame coupling portion 115, a vehicle body frame coupling portion 116, engine support portions 117 and 118, and a swing arm support portion 121. The vehicle body frame coupling portion 115 is provided around the lower coupling hole 115*a* in order to couple each of the dogleg brackets 13 and 14 to each of the lower frames 43 and 44 of the vehicle body frame 11 through the cross member 95, each of the erected plates 96 and 97, and each of the triangular plates 101 and 102. The vehicle body frame coupling portion 116 is provided around the upper coupling hole 116*a* in order to couple each of the dogleg brackets 13 and 14 to each of the center frames 36 and 37 of the vehicle body frame 11 through each of the upper brackets 104 and 106 and each of the upper plates 107 and 108. The engine support portion 117 is provided around the upper support hole 117*a* into which the portion 12*c* is to be attached in order to support the engine 12. The engine support portion 118 is provided around the lower support hole 118*a* into which the portion 12*d* is to be attached in order to support the engine 12. The swing arm support portion 121 is provided around the center support hole 121*a* in order to support the swing arm 17.

The engine support portions 117 and 118 and the swing arm support portion 121 are provided at positions close to the respective vertices of each of the also substantially triangular dogleg brackets 13 and 14.

The vehicle body frame coupling portions 115 and 116 are provided at positions closer to the swing arm support portion 121 than the engine support portions 117 and 118 are in the vicinity of the engine support portions 117 and 118.

Figure 4:
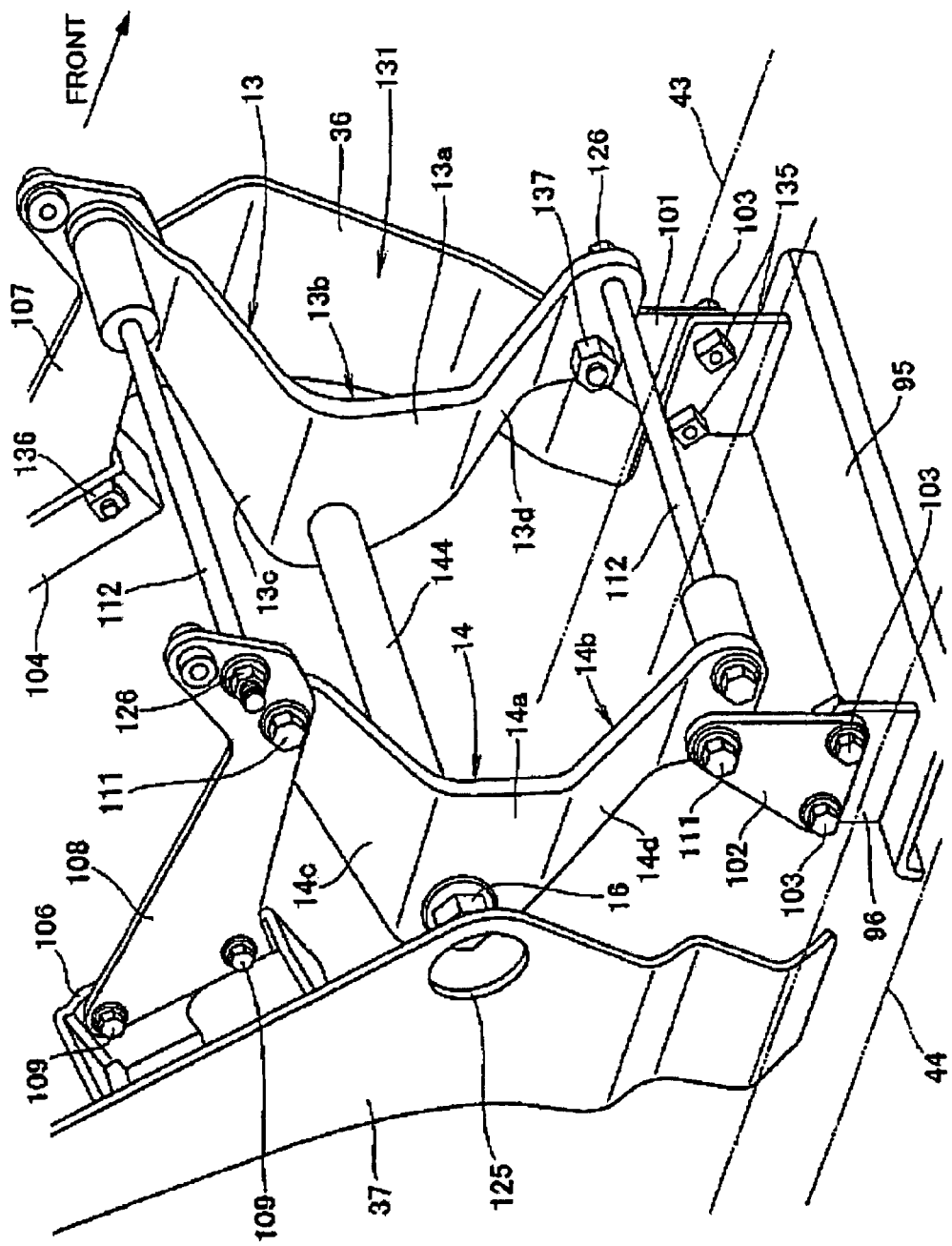
FIG. 4 is a perspective view showing the swing arm support structure according to the present invention.

FIG. 4 is a perspective view showing the swing arm support structure according to the present invention. The dogleg brackets 13 and 14 are plate-like members in which center portions, and specifically, pivot shaft attachment portions 13*a* and 14*a* to which the pivot shaft 16 is attached are bent to one side. The dogleg brackets 13 and 14 are arranged between the center frames 36 and 37.

The pivot shaft 16 and the bolts 112 and 112 for supporting the engine 12, see FIG. 3, are members individually bridged between the left and right dogleg brackets 13 and 14. A pivot shaft insertion hole 125 is opened in one of the center frames 37 in order to insert the pivot shaft 16 therethrough with nuts 126 being screwed onto tip ends of the bolts 112.

Figure 5:
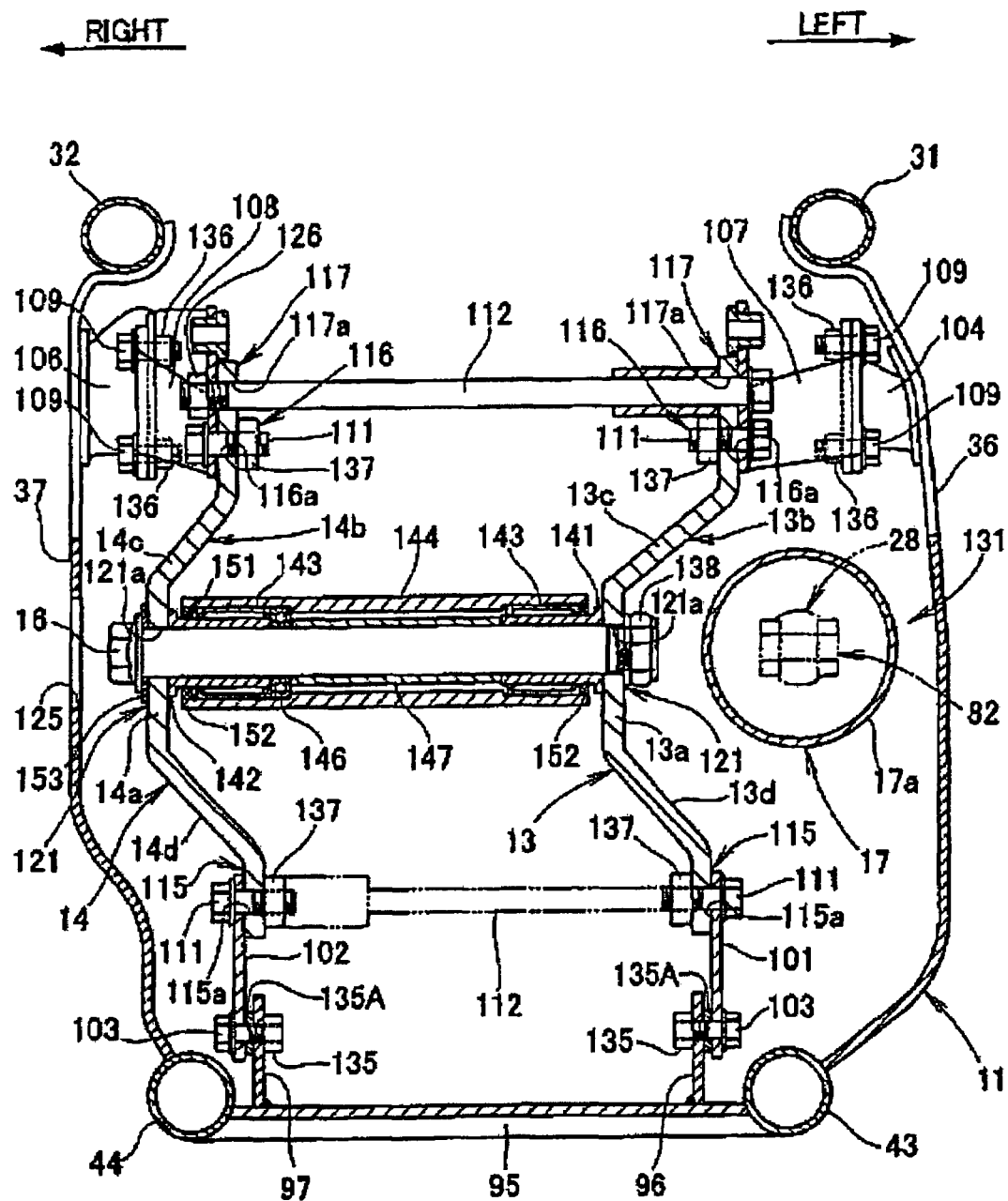
FIG. 5 is a cross-sectional view taken along a line 5-5 of FIG. 3.

FIG. 5 is a cross-sectional view taken along a line 5-5 of FIG. 3, in which an arrow (LEFT) indicates the left side of the vehicle body, and an arrow (RIGHT) indicates the right side of the vehicle body. FIG. 5 shows the following structure. More specifically, the dogleg brackets 13 and 14 are members which are bent to project the pivot shaft attachment portions 13*a* and 14*a* to the right and sideward. Accordingly, recessed portions 13*b* and 14*b* are formed on the left side of the pivot shaft attachment portions 13*a* and 14*a*. Moreover, a space 131 to dispose the shaft housing portion 17*a* of the swing arm 17 and the universal joint 28 for the drive shaft 29, see FIG. 2, is formed. This space 131 is formed between the left-side dogleg bracket 13 and the left-side center frame 36.

Slant portions 13*c*, 13*d*, 14*c* and 14*d* form the recessed portions 13*b* and 14*b* of the dogleg brackets 13 and 14. Nuts 135 are welded to the erected plates 96 and 97 so as to be screwed to the bolts 103 with spacers 135A. Nuts 136 are welded to the upper brackets 104 and 106 so as to be screwed to the bolts 109. Nuts 137 are welded to the dogleg brackets 13 and 14 so as to be screwed to the bolts 111. A nut 138 is screwed to an end portion of the pivot shaft 16.

A left collar 141 and a right collar 142 are fitted onto the pivot shaft 16. A cylindrical member 144 is attached to rotate freely to these left collar 141 and right collar 142 through needle bearings 143 and 143.

The cylindrical member 144 is a member provided on a front end of the swing arm 17, see FIG. 3, in order to form the swing arm 17.

A ball bearing 146 fitted between the pivot shaft 16 and the cylindrical member 144 is adjacent to one of the needle bearings 143. A center collar 147 is interposed between the ball bearing 146 and the left collar 141 and fitted onto the pivot shaft 16. A snap ring 151 is attached to an inner surface of the cylindrical member 144 so as to be adjacent to one of the needle bearings 143 in order to regulate a position of the cylindrical member 144 in an axial direction. Dust seals 152 and 152 prevent dust from entering the cylindrical member 144. A washer 153 is provided.

As shown in FIGS. 1 and 3, the present invention provides a vehicle 10 with the rear wheel 18 attached to the rear end of the swing arm 17 that is made freely swingable with respect to the vehicle body frame 11. Dogleg brackets 13 and 14 are provided which include the vehicle body frame coupling portions 115 and 116 coupled to the vehicle body frame 11 and engine support portions 117 and 118 for supporting the engine 12. The swing arm support portions 121 for supporting the swing arm 17 are provided in the dogleg brackets 13 and 14, and the swing arm support portions 121 are provided apart and separately from the vehicle body frame coupling portions 115 and 116.

In this way, torsion can be generated in the dogleg brackets 13 and 14 disposed between the swing arm support portions 121 and the vehicle body frame coupling portions 115 and 116. In addition, distances between the swing arm support portions 121 and the vehicle body frame coupling portions 115 and 116 are changed, thus making it possible to easily adjust the transmission of the external force transmitted from the rear wheel 19 through the swing arm 17 to the vehicle body frame 11. Consequently, designing is performed more freely.

As shown in FIGS. 2 and 5, an embodiment of the present invention includes the recessed portions 13b and 14b recessed in a vehicle width direction that are formed in the dogleg brackets 13 and 14. The power transmission shaft 82, specifically, the output shaft 27, the universal joint 28, and the rubber boot 81, extend from the engine 12 side in order to drive the rear wheel 18 (refer to FIG. 1), and are made to go through the one recessed portion 13b.

In this way, the space 131 through which the power transmission shaft 82 is made to go through can be easily ensured.

According to an embodiment of the present invention, the left and right pair of dogleg brackets 13 and 14 are provided wherein the recessed portions 13b and 14b are formed in the left and right dogleg brackets 13 and 14 so as to be recessed in the same direction along the vehicle width direction. More specifically, towards the right direction of the vehicle. The swing arm support portions 121 are formed in the bottom portions of the recessed portions 13b and 14b.

In this way, an interval between which the swing arm 17 is supported can be easily ensured, thus making it possible to enhance torsion rigidity of the swing arm 17.

According to an embodiment of the present invention, the vehicle body frame 11, specifically, the center frames 36 and 37, are arranged so as to cover outer sides of the swing arm support portions 121.

In this way, both end portions of the pivot shaft 16 that supports the swing arm 17 do not project crosswise, thus making it easier for a rider to land the feet.

Further, according to an embodiment of the present invention, each of the dogleg brackets 13 and 14 is coupled to the vehicle body frame 11 side by two points in upper and lower regions. To be precise, the dogleg brackets 13 and 14 are coupled to the vehicle body frame 11, more specifically, the center frames 36 and 37, side through the upper brackets 104 and 106 and the upper plates 107 and 108, and are coupled to the vehicle body frame 11, more specifically, the lower frames 43 and 44, side through the cross member 95, the erected plates 96 and 97, and the triangular plates 101 and 102.

In this way, the dogleg brackets 13 and 14 can be tightly supported, and the engine 12 and the swing arm 17 can be supported securely by the dogleg brackets 13 and 14 as described above.

Note that, in this embodiment, the upper and lower portions of the dogleg brackets 13 and 14 are coupled to the upper plates 107 and 108 and the triangular plates 101 and 102 as shown in FIG. 5. However, in other cases, the upper and lower portions of the dogleg brackets 13 and 14 may be coupled to the upper brackets 104 and 106 and the erected plates 96 and 97.

The swing arm support structure of the present invention is suitable for a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A swing arm support structure of a vehicle in which a rear wheel is attached to a distal end of a swing arm with a proximal end being freely swingable with respect to a vehicle body frame, comprising:
   a bracket including a vehicle body frame coupling portion coupled to a side of the vehicle body frame, and an engine support portion for supporting an engine; and
   the bracket further including a swing arm support portion in a central portion thereof, said swing arm support portion supporting the swing arm;
   said swing arm support portion and the vehicle body frame coupling portion of the bracket are parallel to each other, and are provided at different parts of the bracket,
   the swing arm support portion being offset to one side in a vehicle width direction with respect to the vehicle body frame coupling portion.

2. The swing arm support structure of a vehicle according to claim 1, wherein the bracket is a member in which a recessed portion recessed in the vehicle width direction is formed in the central portion thereof; and
   a power transmission shaft extending from the engine side in order to drive the rear wheel goes through the recessed portion.

3. The swing arm support structure of a vehicle according to claim 1, wherein the bracket includes a left bracket and a right bracket, each of which is formed with the recessed portion;
   the recessed portions being formed in the left and right brackets are recessed in the same direction along the vehicle width direction; and
   the swing arm support portions are formed in bottom portions of the recessed portions.

4. The swing arm support structure of a vehicle according to claim 1, wherein
   the vehicle body frame coupling portion is provided at a position closer to the swing arm support portion than the engine support portion.

5. The swing arm support structure of a vehicle according to claim 1, wherein the vehicle body frame is disposed for covering outer sides of the swing arm support portions.

6. The swing arm support structure of a vehicle according to claim 2, wherein the vehicle body frame is disposed for covering outer sides of the swing arm support portions.

7. The swing arm support structure of a vehicle according to claim 3, wherein the vehicle body frame is disposed for covering outer sides of the swing arm support portions.

8. The swing arm support structure of a vehicle according to claim 4, wherein the vehicle body frame is disposed for covering outer sides of the swing arm support portions.

9. The swing arm support structure of a vehicle according to claim 1, wherein the bracket is coupled to the vehicle body frame side by two points in upper and lower regions.

10. The swing arm support structure of a vehicle according to claim 2, wherein the bracket is coupled to the vehicle body frame side by two points in upper and lower regions.

11. The swing arm support structure of a vehicle according to claim 3, wherein each of the brackets is coupled to the vehicle body frame side by two points in upper and lower regions.

12. The swing arm support structure of a vehicle according to claim 4, wherein the bracket is coupled to the vehicle body frame side by two points in upper and lower regions.

13. The swing arm support structure of a vehicle according to claim 5, wherein the bracket is coupled to the vehicle body frame side by two points in upper and lower regions.

14. A swing arm support structure for a vehicle, comprising:
 a swing arm including a proximal end freely swingable with respect to a vehicle body frame, said swing arm including a distal end for operatively supporting a wheel;
 a bracket including:
  a vehicle body frame coupling portion coupled to a side of the vehicle body frame;
  an engine support portion for supporting an engine; and
  a swing arm support portion in a central portion of the bracket for supporting the swing arm;
  said swing arm support portion and the vehicle body frame coupling portion of the bracket are parallel to each other, and are provided at different parts of the bracket,
 the swing arm support portion being offset to one side in a vehicle width direction with respect to the vehicle body frame coupling portion.

15. The swing arm support structure for a vehicle according to claim 14, wherein the bracket is a member in which a recessed portion recessed in the vehicle width direction is formed in the central portion thereof; and
 a power transmission shaft extending from the engine side in order to drive the rear wheel goes through the recessed portion.

16. The swing arm support structure for a vehicle according to claim 14, wherein the bracket includes a left bracket and a right bracket, each of which is formed with the recessed portion;
 the recessed portions being formed in the left and right brackets are recessed in the same direction along the vehicle width direction; and
 the swing arm support portions are formed in bottom portions of the recessed portions.

17. The swing arm support structure for a vehicle according claim 14, wherein
 the vehicle body frame coupling portion is provided at a position closer to the swing arm support portion than the engine support portion.

18. The swing arm support structure for a vehicle according to claim 14, wherein the vehicle body frame is disposed for covering outer sides of the swing arm support portions.

19. The swing arm support structure for a vehicle according to claim 15, wherein the vehicle body frame is disposed for covering outer sides of the swing arm support portions.

20. The swing arm support structure for a vehicle according to claim 16, wherein the vehicle body frame is disposed for covering outer sides of the swing arm support portions.

* * * * *